(12) United States Patent
Yoshida et al.

(10) Patent No.: US 7,081,942 B2
(45) Date of Patent: Jul. 25, 2006

(54) PHOTOPRINTER

(75) Inventors: Yuichi Yoshida, Daito (JP); Takashi Maeda, Daito (JP)

(73) Assignee: Funai Electric Co., Ltd., Daito (JP)

( * ) Notice: Subject to any disclaimer, the term of this patent is extended or adjusted under 35 U.S.C. 154(b) by 135 days.

(21) Appl. No.: 10/864,381

(22) Filed: Jun. 10, 2004

(65) Prior Publication Data

US 2005/0018153 A1    Jan. 27, 2005

(30) Foreign Application Priority Data

Jun. 10, 2003    (JP) ............................. 2003-165037

(51) Int. Cl.
*G03B 29/00* (2006.01)
*G03B 27/52* (2006.01)

(52) U.S. Cl. ............................. 355/29; 355/28; 355/40

(58) Field of Classification Search ............... 355/29, 355/28, 40; 399/385; 347/16
See application file for complete search history.

(56) References Cited

FOREIGN PATENT DOCUMENTS

JP    2002-86827    3/2002

*Primary Examiner*—Peter B. Kim
(74) *Attorney, Agent, or Firm*—Crowell & Moring LLP

(57) ABSTRACT

When a margin paper constituting a margin between pictured formed sheets, on which pictures have been formed, is cut by a cutter, it is received in a casing. The number of times, in which cutting means cuts a number of sheets to avoid overflowing of the margin paper received in the casing, is beforehand set as a set value, and the number of times, in which the cutter cuts a roll paper, is counted. When a count value reaches the set value, a control unit turns the casing so that an upper opening of the casing is directed downward, and causes the margin paper in the casing to be ejected. When a predetermined period of time has elapsed, the casing is again turned to be returned to an original state. The number of times as counted is reset and counting is again performed.

10 Claims, 6 Drawing Sheets

PHOTOPRINTER

BACKGROUND OF THE INVENTION

1. Field of the Invention

The present invention relates to a photoprinter provided with margin paper receiving device that receives a margin cut off from a continuous paper.

2. Description of the Related Art

Photoprinters use a roll paper to be able to continuously print photographs having different sizes such as normal size, panorama size, etc. without replacing sheets. In photoprinters, when a picture is formed on a roll paper, that portion (a trailing end of a portion, on which the picture is formed), on which the picture is not formed, is in some cases exposed to light. Therefore, with conventional photoprinters, such portion (margin paper) exposed to light is cut/ejected and a portion (picture formed paper), on which a picture is formed, is cut/ejected.

Conventional photoprinters include a container that recovers therein a margin paper. There has been proposed a photoprinter provided with a weight detector that detects a weight of a container that recovers a margin paper (see, for example, JP-A-2002-86827 (pages 3 to 4, FIGS. 1 and 2), JP-A-2002-86827 describes an apparatus capable of stacking pieces of paper (margin paper) orderly to recover the same in a paper piece recovering device and using a weight detector to detect a weight of the paper piece recovering device to issue an alarm before pieces of paper overflow the paper piece recovering device.

With the apparatus described in JP-A-2002-86827, when the weight detector detects a weight of the paper piece recovering device, an alarm is issued as by lighting a LED, but a user overlooks lighting of the LED in some cases. Therefore, the apparatus involves a problem that pieces of paper (margin paper) overflow the paper piece recovering device to cause lodgment of paper and failure.

SUMMARY OF THE INVENTION

It is an object of the invention to provide a photoprinter free from generation of lodgment of paper and failure caused by overflowing of recovered margin paper even when a plurality of sheets of picture formed paper are formed.

The invention includes the following constitution as measure for solving the above problem.

(1) The constitution has a feature in a photoprinter including a picture forming device to form a picture on a roll paper, a cutting device to cut off a picture formed paper, on which a picture has been formed, and a margin paper, which constitutes a margin between the picture formed papers, from a continuous paper, a margin paper receiving device to receive therein a margin paper, the photoprinter being characterized by the counting device to count the number of times, in which the cutting device performs cutting, and an ejection device to eject the margin paper from the margin paper receiving device when the number of times counted by the counting device reaches a set value.

With such constitution, the number of times, in which the cutting device cuts a number of sheets to avoid overflowing of the margin paper received in the margin paper receiving device, is beforehand set as a set value, whereby the margin paper received in the margin paper receiving device can be ejected periodically without causing the margin paper to overflow the margin paper receiving device to cause lodgment of paper and failure. Accordingly, a user of the photoprinter can use the photoprinter without caring about that timing, at which the margin paper should be discarded.

(2) The constitution has a feature in that the margin paper receiving device is in the form of a box having an opening at an upper portion thereof and pivotally born by a rotating shaft arranged substantially horizontal, and the ejection device includes turning device to turn the margin paper receiving device.

With such constitution, when the margin paper is cut by the cutting device, it is received from the opening at the upper portion of the box-shaped margin paper receiving device to accumulate successively. Also, by setting the turning device to turn the margin paper receiving device to a position, in which the opening of the margin paper receiving device is directed obliquely downward, or downward, the margin paper received in the margin paper receiving device can be ejected when the number of times counted by the counting device reaches a set value. Accordingly, a user can easily discard the margin paper. Also, with the photoprinter, the margin paper receiving device is not removed but turned to eject the margin paper, so that there is no fear that a user erroneously inserts a hand into the vicinity of the cutting device, whereby it is possible to prevent a user from getting hurt by the cutter device.

(3) The constitution has a feature in that the margin paper receiving device is in the form of a box having an opening at an upper portion thereof and includes an openable lid at a bottom surface or a side thereof, and the ejection device includes opening and closing device to open and close the lid.

With such constitution, when the number of times counted by the counting device reaches a set value, the turning device is actuated to turn the margin paper receiving device whereby the margin paper received in the margin paper receiving device can be easily ejected. Also, with the photoprinter, the margin paper receiving device is not removed but the lid is opened to eject the margin paper, so that there is no fear that a user erroneously inserts a hand into the vicinity of the cutting device, whereby it is possible to prevent a user from getting hurt by the cutter device.

(4) The constitution has a feature in that the ejection device includes a fan to blow the wind inside the margin paper receiving device.

With such constitution, the fan is set to blow the wind inside the margin paper receiving device when the margin paper should be ejected from the margin paper receiving device, so that the wind from the fan can be made use of in order to eject the margin paper and the margin paper can be ejected from the margin paper receiving device in a short period of time. Accordingly, a user can form a picture in the photoprinter without caring about that timing, at which the margin paper accumulated in the photoprinter should be discarded.

(5) The constitution has a feature in that the margin paper receiving device is provided on at least one of the bottom surface and the side thereof with a plurality of gaps sized not to allow the margin paper to pass therethrough.

With such constitution, the plurality of gaps are provided at least on the bottom surface of the margin paper receiving device, so that the fan can blow the wind inside the margin paper receiving device from the bottom surface thereof. Accordingly, freedom in a position, in which the fan is arranged, is increased, so that it is possible to install the fan in a position, in which assembly is easy, and to reduce manhour in assembling. Also, by arranging the fan in a position suited for ventilation in the photoprinter, the fan can serve for ejection of the margin paper and for ventilation in the photoprinter, which makes it possible to prevent an increase in cost.

BRIEF DESCRIPTION OF THE DRAWINGS

These and other objects and advantages of this invention will become more fully apparent from the following detailed description taken with the accompanying drawings in which.

DESCRIPTION OF THE PREFERRED EMBODIMENTS

Figure 1:
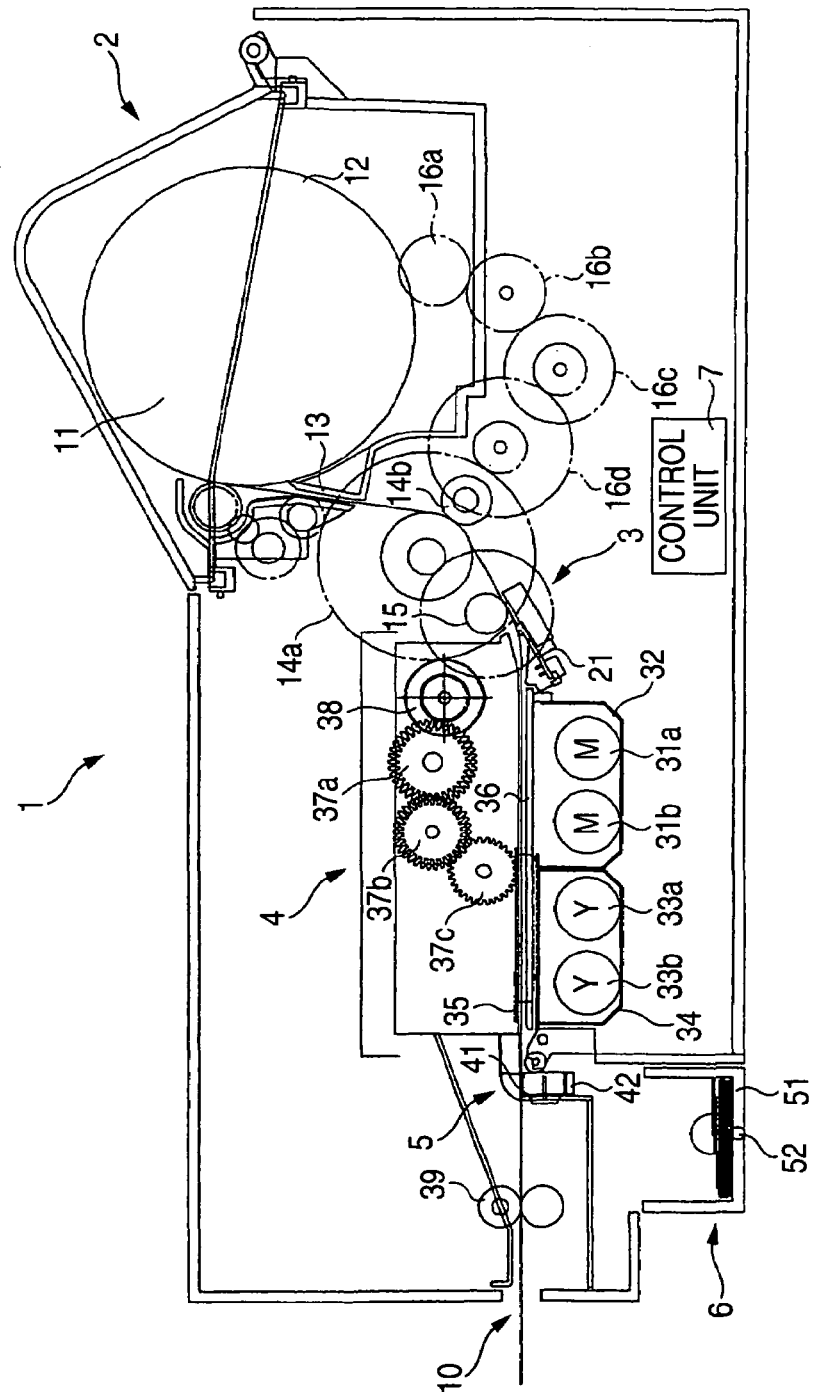
FIG. 1 is a front, perspective view schematically showing a constitution of a photoprinter according to an embodiment of the invention.

FIG. 1 is a front, perspective view schematically showing a constitution of a photoprinter according to an embodiment of the invention. In the following descriptions, a printer of the TA system (also called a thermo-autochrome system or a light fixing type direct thermal recording system) will be explained by way of example. Here, the TA system is one that forms a full color picture by repeating heating by a thermal head and fixing by irradiation of ultraviolet rays on a special purpose paper, which is called TA paper, and on which three thermal color development layers for color development of three primary colors of Y (yellow)•M (magenta)•C (cyanogen) are laminated.

As shown in FIG. 1, a photoprinter 1 includes a paper feeding section 2, a picture forming section 3, a fixing unit 4, a cutting section 5, a margin paper receiving section 6, and a control unit 7. The paper feeding section 2 includes a roll-paper holding member 12 that supports a roll paper 11 formed by winding a continuous TA paper on a columnar core, a paper guide 13 that guides the roll paper 11, and synchronous gears 16a to 16d for synchronism of rotations of a pair of conveyance rollers 14 (14a, 14b)•a conveyance roller 15, the pair of conveyance rollers 14, the conveyance roller 15, and the roll-paper holding member 12 to control feed of the roll paper 11. In addition, the roll-paper holding member 12 is driven by a motor (not shown).

The picture forming section 3 includes a thermal head 21 that heats the roll paper to form a picture, and a temperature controller 22 (not shown) that adjusts temperature of the thermal head 21.

The fixing unit 4 includes fluorescent tubes 31a, 31b for fixation of magenta, a reflector 32 that covers surroundings of the fluorescent tubes 31a, 31b, fluorescent tubes 33a, 33b for fixation of yellow, a reflector 34 that covers surroundings of the fluorescent tubes 33a, 33b, a shutter 35 that moves above the fluorescent tubes 31a, 31b and the fluorescent tubes 33a, 33b to intercept light so that a portion of the roll paper 11 formed with no picture is not exposed to light, a guide member 36 that assists the shutter 35, gears 37a to 37c that move the shutter 35, a clutch 38 that interlocks movements of the shutter 35 with feeding of the roll paper 11, a pair of ejection rollers 39 that eject the roll paper 11, and a fluorescent-tube lighting circuit 40 (not shown) that lights the fluorescent tubes 31a, 31b and the fluorescent tubes 33a, 33b. In addition, the fluorescent tubes 31a, 31b and the fluorescent tubes 33a, 33b irradiate ultraviolet rays having different wavelengths.

The cutting section 5 includes a cutter 41 that cuts the roll paper 11, and a cutter moving mechanism 42 that moves the cutter 41 in a direction perpendicular to a direction, in which the roll paper 11 is fed.

The margin paper receiving section 6 is in the form of a box having an opening in an upper portion thereof, and includes a casing 51 that receives a margin paper inside through the opening, and a turning mechanism 52 that turns the casing 51 in order to direct the upward directed opening of the casing 51 downward or obliquely downward to eject the margin paper received in the casing 51. The control unit 7 controls operations of respective parts of the photoprinter 1, details of which are omitted.

Before a picture is formed in the photoprinter 1, the control unit 7 causes a motor (not shown) to rotate the roll-paper holding member 12 to feed a predetermined length of the roll paper 11, and thereafter stops rotation of the roll-paper holding member 12. Then, the control unit 7 causes the cutter moving mechanism 42 to move the cutter 41 to cut a margin paper being a non-picture formed portion that has been exposed to light at the time of picture formation at the last time. The cut margin paper drops to be received in the casing 51. In addition, it suffices that the margin paper be preset to an appropriate length corresponding to sizes of the photoprinter and the roll paper 11 on the basis of experiments or the like.

Subsequently, the control unit 7 causes a motor (not shown) to rotate the roll-paper holding member 12 to move a leading end of the roll paper 11. Then, the control unit 7 controls the temperature controller 22 (not shown), the fluorescent-tube lighting circuit 40 (not shown), and the motor (not shown) that controls conveyance of the roll paper 11, to perform the following processings. That is, (1) the thermal head 21 is used to heat the roll paper 11 at a low temperature to form a yellow picture. (2) The fluorescent tubes 33a, 33b irradiate ultraviolet rays to fix the yellow picture. (3) The thermal head 21 is used to heat the roll paper 11 at a medium temperature to form a magenta picture. (4) The fluorescent tubes 31a, 31b irradiate ultraviolet rays to fix the magenta picture. (5) The thermal head 21 is used to heat the roll paper 11 at a high temperature to form a cyanogen picture. In addition, no ultraviolet rays are irradiated since there is no need of fixing the cyanogen picture.

When formation of a picture on the roll paper 11 is completed, the control unit 7 feeds the roll paper 11 and stops feeding of the roll paper 11 in a position, in which a trailing end of the picture formed on the roll paper 11 is opposed to the cutter 41. Then, the control unit 7 causes the cutter moving mechanism 42 to move the cutter 41 to cut a picture formed paper being a picture formed portion. The picture formed paper as cut is ejected from an eject port 10 by the pair of ejection rollers 39. In this manner, whenever a sheet of the picture formed paper is formed, a single sheet of margin paper is received in the casing 51.

Figure 2A:
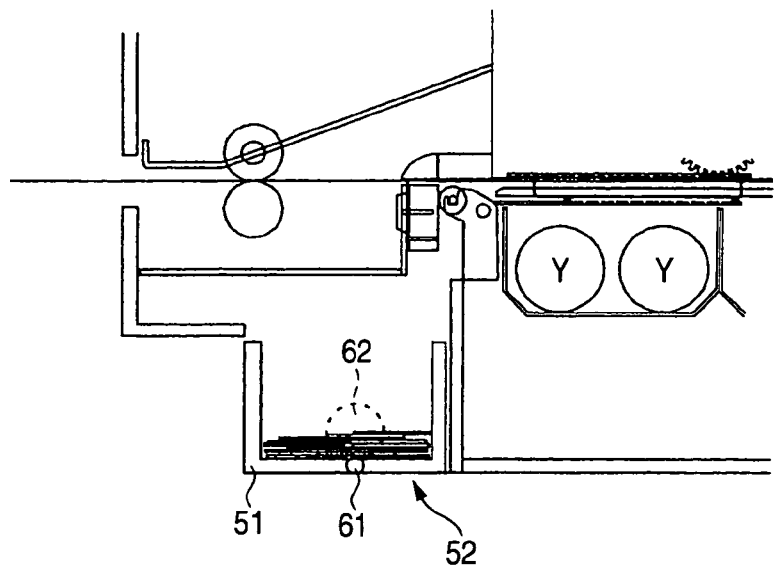
FIG. 2 is a view schematically showing a constitution of a turning mechanism for a margin paper receiving section.

FIG. 2 is a view showing an outline of the turning mechanism in the margin paper receiving section. As shown in FIG. 2(A), the turning mechanism 52 includes a shaft 61 and a motor 62. The shaft 61 is mounted substantially horizontally at the bottom of the casing 51. That is, the shaft 61 is mounted perpendicularly to a direction, in which the roll paper 11 is conveyed, and when the shaft 61 is turned, the casing 51 is turned. Also, the shaft 61 is connected to the motor 62 directly or via gears.

Figure 3:
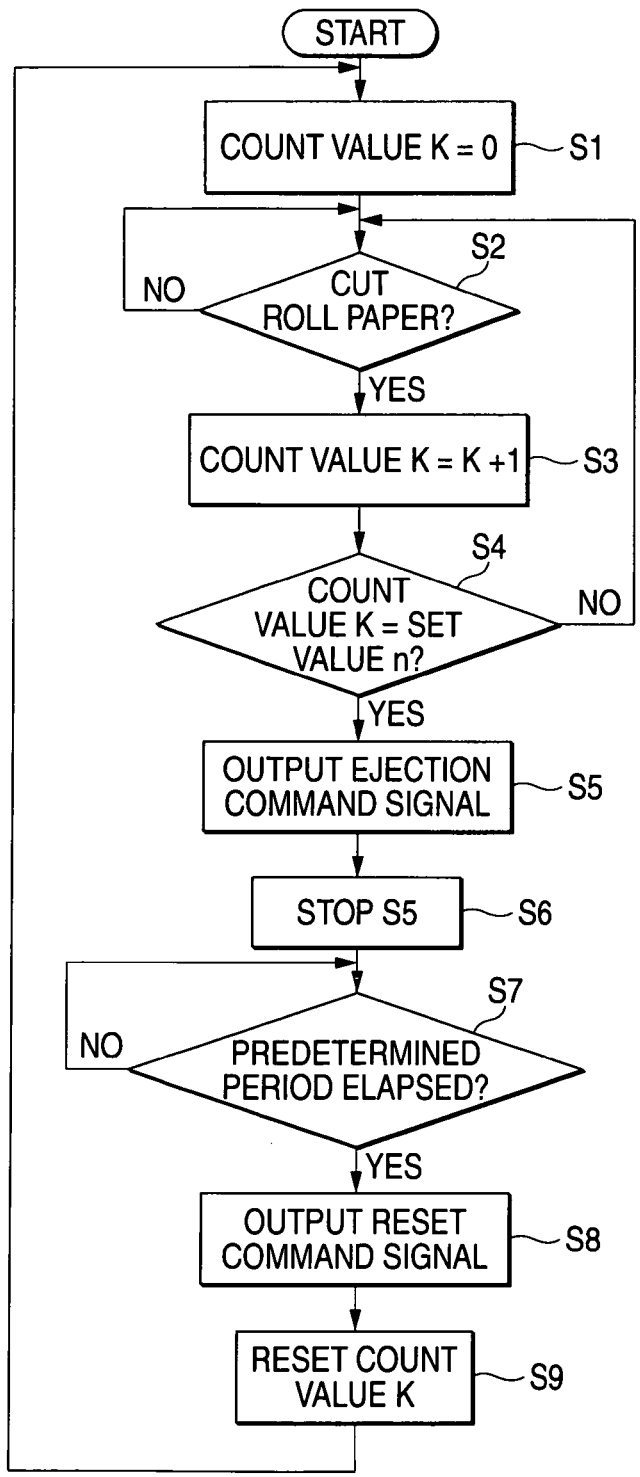
FIG. 3 is a flowchart illustrating a margin-paper ejecting operation of the photoprinter.

As described above, when the margin paper overflows the casing 51, paper lodgment is generated to be responsible for failure. Hereupon, with the photoprinter 1 according to the invention, when a predetermined number of sheets of margin paper are received in the casing 51, the margin paper is automatically ejected outside the photoprinter 1. Concretely, the photoprinter 1 operates in the following manner. FIG. 3 is a flowchart illustrating a margin-paper ejecting operation of the photoprinter.

With the photoprinter 1, the number of times, in which the cutter moving mechanism 42 for operating the cutter 41 acts, is in proportion to the number of sheets of margin paper received in the casing 51, and thus the control unit 7 counts the number of times, in which the cutter moving mechanism 42 acts. Also, a predetermined set value is preset in the control unit 7 so that the margin paper received in the casing 51 does not overflow. Set as the set value is the number of times, in which the cutter moving mechanism 42 is caused to act until the number of sheets of margin paper received in the casing 51 overflows since the casing 51 is vacant. For example, in the case where an upper limit of the number of sheets of margin paper received in the casing 51 is 100, the control unit 7 must actuate the cutter moving mechanism 42 two hundred times (precisely, 199 times) in order to cut one hundred sheets of margin paper. Accordingly, in this case, k=200 is appropriate as a set value set in the control unit 7.

As shown in FIG. 3, when the cutter 41 in the cutting section 5 first cuts the margin paper, or when a count value is reset, the count value is set in the control unit 7 to be 0 (s1). When actuating the cutter moving mechanism 42 in order to cut the roll paper 11 with the use of the cutter 41 (s2), the control unit 7 counts a count value k of the number of times, in which the cutter moving mechanism 42 acts, and adds 1 to the count value (s3). The control unit 7 judges whether the count value k corresponds to a set value n (s4), and repeatedly implements the processings of the steps s2 to s4 until the count value k reaches the set value n.

Figure 2B:
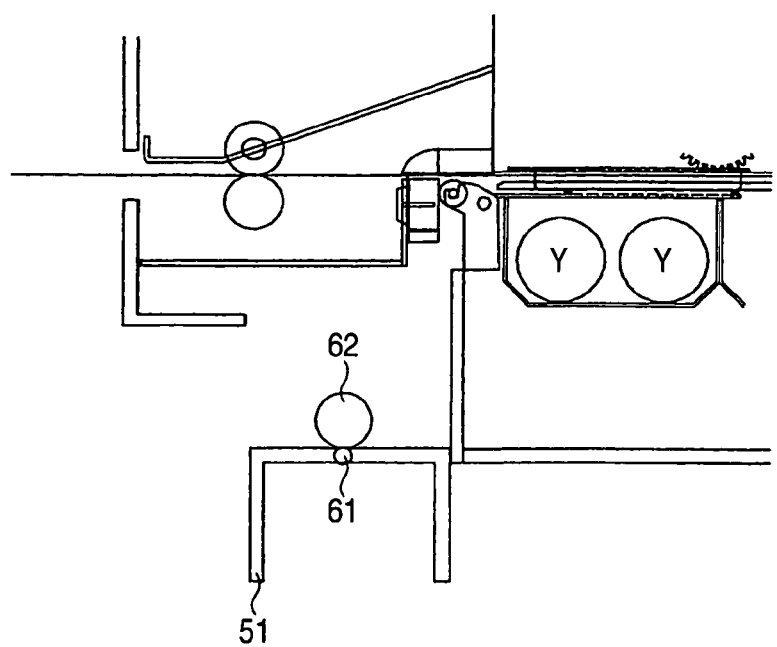

When the number of times, in which the cutter moving mechanism 42 acts, reaches the set value n (n4), the control unit 7 outputs a signal (ejection command signal) to the motor 62 to turn the casing 51 (s5). When the motor 62 is actuated by an ejection command signal from the control unit 7, power of the motor 62 is transmitted to the casing 51 via the shaft 61, so that the casing 51 is turned from an initial state, in which the opening of the casing 51 is disposed upward, to direct the opening of the casing 51 obliquely downward, or downward as shown in FIG. 2(B). The control unit 7 stops issuance of an ejection command signal and stops the motor 62 in this state (s6). Thereby, the margin paper received in the casing 51 falls due to gravity, and so is ejected from the casing 51.

When a preset predetermined time has elapsed (s7), the control unit 7 outputs a signal (reset command signal) to the motor 62 to turn the casing 51 (s8). Receiving the signal, the motor 62 turns the casing 51 to return the same to the initial state (s8). Also, the control unit 7 resets the count value k (s9). Then, the control unit 7 repeatedly implements the above processings in the order from the step s1 on.

In addition, it suffices that experiments or the like be conducted to beforehand confirm the housing capacity (the number of sheets being possibly received) of the margin paper received in the casing 51, on the basis of results of which the set value is set.

Figure 4:
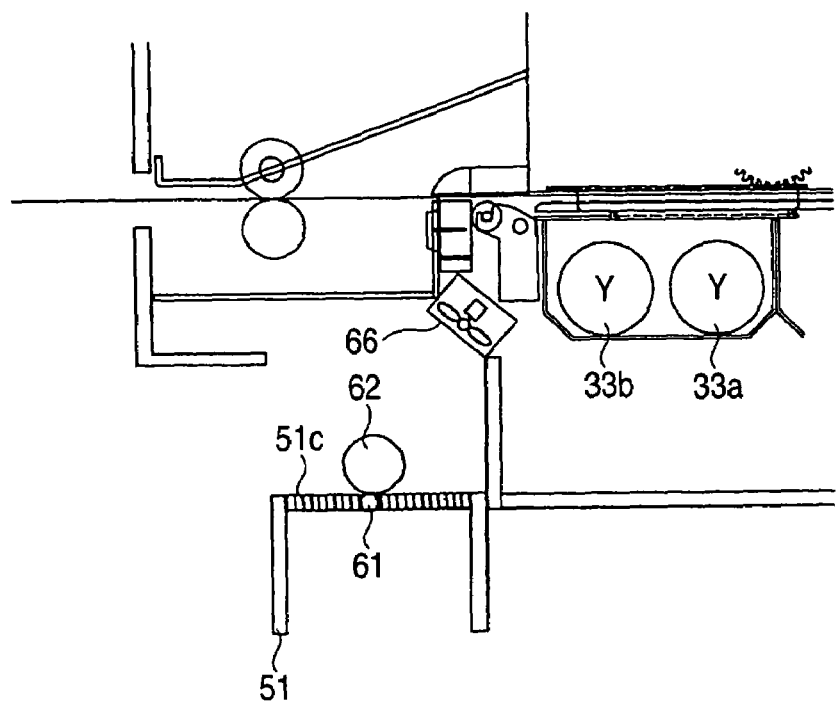
FIG. 4 is a view schematically showing a constitution of a partial modification of the margin paper receiving section shown in FIG. 2.

FIG. 4 is a view showing an outline of a partial modification of the margin paper receiving section shown in FIG. 2. As shown in FIG. 4, a fan 66 may be provided to blow the wind into the casing 51 when the upper surface of the casing 51 is directed obliquely downward, or downward, thereby forcibly ejecting the margin paper received in the casing 51. At this time, a plurality of gaps sized to allow an air to easily pass therethrough but not to allow the margin paper to pass therethrough are provided at a bottom surface 51c and a part of sides of the casing 51 in, for example, a latticed manner. Further, the fan 66 is preferably arranged in a manner to blow the wind into the casing 51 from a bottom side of the casing 51 when the casing 51 is turned to have the upper surface thereof directed obliquely downward, or downward.

Also, by arranging the fan 66 in a position shown in FIG. 4, the fan can be used as a fan that serves for ventilation in the photoprinter 1, that is, discharges heat generated from the thermal head 21, the fluorescent tubes 31a, 31b, and the fluorescent tubes 33a, 33b, to the outside. Accordingly, the fan 66 can serve as two uses, so that it is possible to prevent an increase in cost.

Figure 5A:
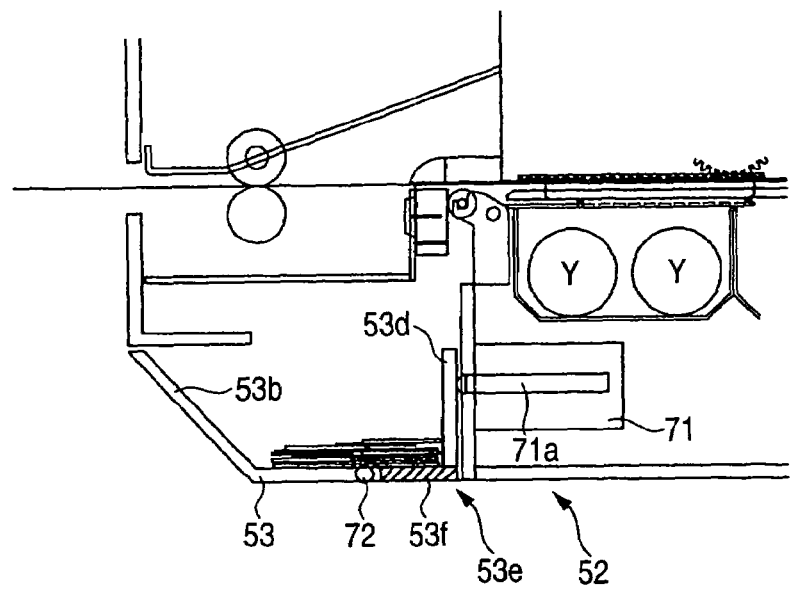
FIG. 5 is a view schematically showing a constitution of a turning mechanism of a margin paper receiving section that is configured differently from those in FIGS. 2 and 4.

Subsequently, an explanation will be given to another configuration of the margin paper receiving section 6. The margin paper receiving section 6 in the photoprinter 1 may be configured differently provided that the margin paper received in the margin paper receiving section 6 is ejected when the number of times, in which the cutting section 5 acts, reaches the set value. FIG. 5 is a view showing an outline of a turning mechanism of a margin paper receiving section that is configured differently from those in FIGS. 2 and 4. A turning mechanism 52 that serves to eject the margin paper from a casing 53 may use a solenoid 71 as shown in FIG. 5. With this configuration, when the control unit 7 outputs an ejection command signal, the solenoid 71 is actuated to have a moving iron core 71a pushing a side 53d of the casing 53, an opening of which is directed upward, so that the casing 53 is turned and the opening of the casing 53 is directed obliquely downward. The casing 53 is provided at a bottom thereof with a shaft 72 that pivotally bears the casing 53. Also, a weight 53f is arranged in the vicinity of a corner 53e on the bottom of the casing 53 so that when the solenoid 71 is not actuated, the casing 53 is stationary in a state (normal state) to receive the margin paper therein. Further, the moving iron core 71a of the solenoid 71 is arranged in a manner to abut against the side 53d of the casing 53.

When the solenoid 71 is actuated by an ejection command signal from the control unit 7, an upper portion of the side 53d of the casing 53 is pushed by the moving iron core 71a, so that the casing 53 is turned and the upper surface of the casing 53 is directed obliquely downward, or downward. Thereby, the margin paper received in the casing 53 falls due to gravity, and so is ejected from the casing 51.

Also, when the control unit 7 outputs a reset command signal, the moving iron core 71a is received in the solenoid 71 and the casing 53 is returned to a normal state, in which the opening thereof is directed upward.

In addition, with the configuration, in which the solenoid 71 is used to turn the casing 53, a side 53b of the casing 53 is preferably inclined at a predetermined angle because a turning angle of the casing 53 is restricted. Thereby, when the casing 53 is turned, the margin paper slides down the side 53b and can be quickly ejected.

Figure 5B:
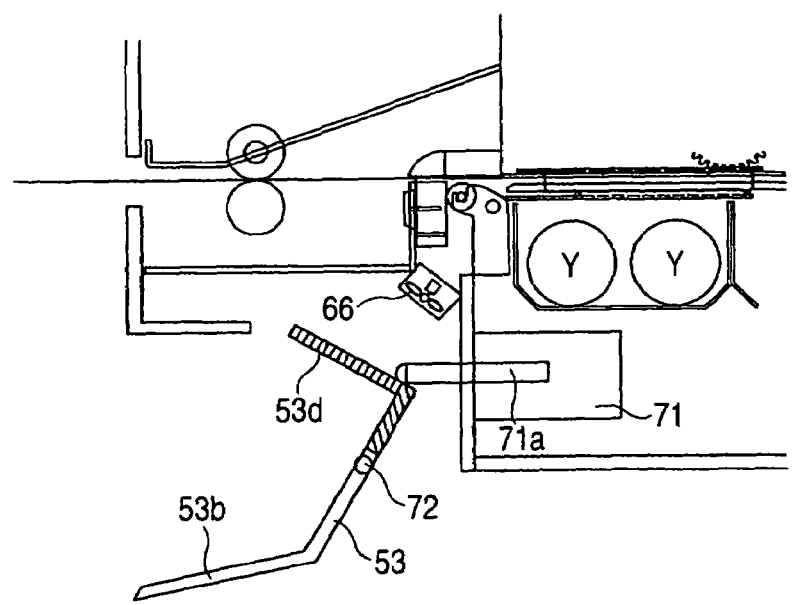

Also, with this configuration, in order to expedite ejection of the margin paper received in the casing 53, a plurality of gaps sized to allow an air to easily pass therethrough but not to allow the margin paper to pass therethrough may be provided on the side 53*d* and a part of the bottom of the casing 53 and the fan 66 is preferably arranged in a manner to blow the wind into the casing 53 as shown in FIG. 5(B). Thereby, the margin paper can be ejected by gravity and wind, so that ejection can be terminated in a short period of time.

Figure 6A:
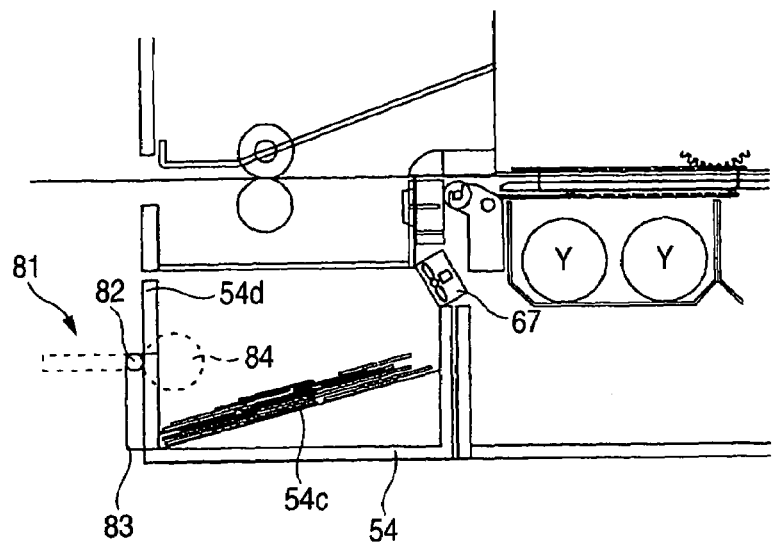
FIG. 6 is a view schematically showing a constitution of a turning mechanism of a margin paper receiving section that is configured differently from those in FIGS. 4 and 5.

FIG. 6 is a view showing an outline of a turning mechanism of a margin paper receiving section that is configured differently from those in FIGS. 4 and 5. With the configuration shown in FIG. 6, a casing 54 is not turned but an opening and closing mechanism 81 is provided to open and close a side or a bottom surface of the casing 54. More specifically, mounted on a side 54*d* of the casing 54 as shown in FIG. 6(A) is a lid 83, one end of which is pivotally born by a shaft 82 mounted perpendicular to a direction of conveyance of the roll paper 11. Also, a bottom surface 54*c* in the casing 54 is inclined to become low toward the lid 83. Further, the shaft 82 is connected to a motor 84, and when the control unit 7 outputs an ejection command signal, the motor 84 is actuated, so that the lid 83 is opened via the shaft 82 by power of the motor 84. Thereby, the margin paper received in the casing 54 slides down the bottom surface 54*c* of the casing to be ejected from the side of the casing 54.

Also, when the control unit 7 outputs a reset command signal to the motor 84 after the lapse of a predetermined period of time since the lid 83 is opened, the lid 83 is closed.

Figure 6B:
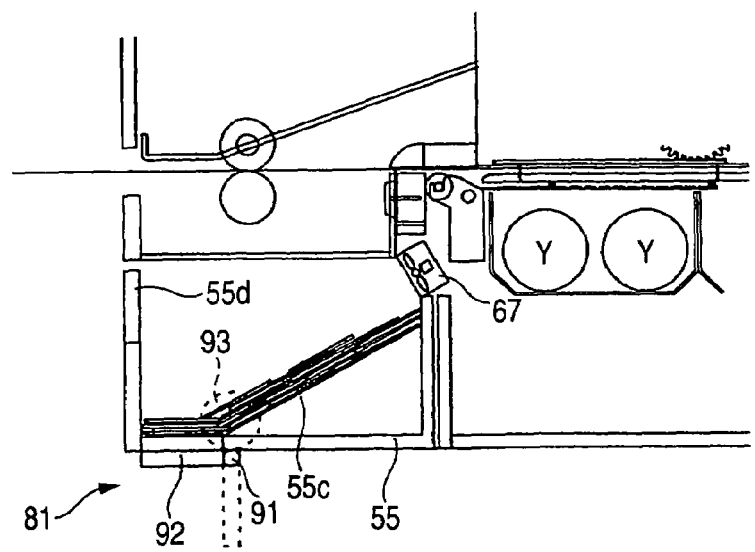

On the other hand, a lid 92 pivotally born by a shaft 91 to be able to open and close may be provided close to an end of a bottom surface 55*c* of a casing 55 as shown in FIG. 6(B). With the configuration, the shaft 91 is connected to a motor 93, and when the control unit 7 outputs an ejection command signal to actuate the motor 93, power of the motor 93 is transmitted to the lid 92 via the shaft 91 and the lid 92 is opened. Since the bottom surface 55*c* is inclined in a manner to become low toward the lid 92, the margin paper received in the casing 55 slides down the bottom surface 55*c* to be ejected from the bottom of the casing 55.

Also, when the control unit 7 outputs a reset command signal to the motor 93 after the lapse of a predetermined period of time since the lid 92 is opened, the lid 92 is closed.

In addition, with the configuration shown in FIG. 6(A) and 6(B), in order to terminate ejection of the margin paper in a short period of time when the lid 83 or the lid 92 is opened, a fan 67 that blows the wind into the casing 51 may be provided above the casing 54 or the casing 55.

As described above, with the photoprinter 1, when the number of sheets of margin paper received in the margin paper receiving section 6 reaches a predetermined number, the margin paper is automatically ejected, so that it is possible to prevent the margin paper from overflowing the casing 51 to cause lodgment of paper and failure. Also, since the photoprinter 1 ejects the margin paper by turning the margin paper receiving section or opening and closing the lid instead of removing the margin paper receiving device, there is no fear that a user erroneously inserts a hand into the vicinity of the cutting section 5, whereby it is possible to prevent a user from getting hurt by the cutter 41.

In addition, a garbage box having a large capacity, or a bag having a large capacity is preferably mounted below the casing 51 of the photoprinter 1. Thereby, it is possible to prevent the margin paper ejected from the casing 51 from scattering.

The invention produces the following effects.

Since the margin paper received in the margin paper receiving device can be ejected periodically, a user of the photoprinter can use the photoprinter without caring about that timing, at which the margin paper should be discarded.

Since when ejecting the margin paper, the photoprinter 1 turns the margin paper receiving section or opens the lid instead of removing the margin paper receiving device, there is no fear that a user erroneously inserts a hand into the vicinity of the cutting device, whereby it is possible to prevent a user from getting hurt by the cutting device.

Further, the wind from the fan can be made use of to eject the margin paper, so that it is possible to eject the margin paper from the margin paper receiving device in a short period of time. Also, the fan can serve for ejection of the margin paper and for ventilation in the photoprinter, so that it is possible to prevent an increase in cost.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A photoprinter comprising:
   picture forming means to form a picture on a roll paper;
   cutting means to cut off a picture formed paper, on which a picture has been formed, and a margin paper, which constitutes a margin between the picture formed papers, from a continuous paper;
   margin paper receiving means to receive therein the margin paper;
   counting means to count a number of times, in which the cutting means performs cutting; and
   ejection means to eject the margin paper from the margin paper receiving means when the number of times counted by the counting means reaches a set value, wherein
   the margin paper receiving means is a box having an opening at an upper portion of the margin paper receiving means and is pivotally supported by a rotating shaft arranged substantially horizontal,
   the ejection means includes turning means to turn the margin paper receiving means
   the ejection means further includes a fan to blow a wind inside the margin paper receiving means, and
   the margin paper receiving means is provided on at least one of the bottom surface of the margin paper receiving means and the side of the margin paper receiving means with at least one gap sized not to allow the margin paper to pass through.

2. A photoprinter comprising:
   picture forming means to form a picture on a roll paper;
   cutting means to cut off a picture formed paper, on which a picture has been formed, and a margin paper, which constitutes a margin between the picture formed papers, from a continuous paper;
   margin paper receiving means to receive therein the margin paper;

counting means to count a number of times, in which the cutting means performs cutting; and ejection means to eject the margin paper from the margin paper receiving means when the number of times counted by the counting means reaches a set value, wherein the margin paper receiving means is a box having an opening at an upper portion of the margin paper receiving means, the margin paper receiving means includes a lid operable to open and close on at least one of a bottom surface of the margin paper receiving means and a side of the margin paper receiving means, the ejection means includes opening and closing means operable to open and close the lid of the margin paper receiving means, the ejection means further includes a fan to blow a wind inside the margin paper receiving means, and the margin paper receiving means is provided on at least one of the bottom surface and the side with at least one gap sized not to allow the margin paper to pass through.

3. A photoprinter comprising:

picture forming means to form a picture on a roll paper;

cutting means to cut off a picture formed paper, on which a picture has been formed, and a margin paper, which constitutes a margin between the picture formed papers, from a continuous paper;

margin paper receiving means to receive the margin paper in the margin paper receiving means;

counting means to count a number of times, in which the cutting means performs cutting; and ejection means to eject the margin paper from the margin paper receiving means when the number of times counted by the counting means reaches a set value.

4. The photoprinter according to claim 3, wherein the margin paper receiving means is a box having an opening at an upper portion of the margin paper receiving means and is pivotally supported by a rotating shaft arranged substantially horizontal, and the ejection means includes turning means to turn the margin paper receiving means.

5. The photoprinter according to claim 3, wherein the margin paper receiving means is a box having an opening at an upper portion of the margin paper receiving means, the margin paper receiving means further include a lid operable to open and close on at least one of a bottom surface of the margin paper receiving means and a side of the margin paper receiving means, and the ejection means includes opening and closing means operable to open and close the lid of the margin paper receiving means.

6. The photoprinter according to claim 4, wherein the ejection means further includes a fan to blow a wind inside the margin paper receiving means.

7. The photoprinter according to claim 6, wherein the margin paper receiving means is provided on at least one of a bottom surface the paper receiving means and a side of the paper receiving means with at least one gap sized not to allow the margin paper to pass through.

8. A photoprinter comprising:

a picture forming device to form a picture on a roll paper;

a cutting device to cut off a picture formed paper, on which a picture has been formed, and a margin paper, which constitutes a margin between the picture formed papers, from a continuous paper;

a margin paper receiving device to receive the margin paper in the margin paper receiving device;

a counting device to count a number of times, in which the cutting device performs cutting;

an ejection device to eject the margin paper from the margin paper receiving device when the number of times counted by the counting device reaches a set value;

a turning device at least partially turning the margin paper receiving device.

9. The photoprinter according to claim 8, wherein the margin paper receiving device further includes a box having an opening at an upper portion of the margin paper receiving device and is pivotally supported by the turning device including a rotating shaft arranged substantially horizontal, and the turning device is provided with the ejection device.

10. The photoprinter according to claim 8, wherein the margin paper receiving device further includes a box having an opening at an upper portion of the margin paper receiving device and a lid operable to open and close on at least one of a bottom surface of the margin paper receiving device and a side of the margin paper receiving device, and the ejection device includes opening and closing device operable to open and close the lid of the margin paper receiving device.

\* \* \* \* \*